(12) United States Patent
Hu et al.

(10) Patent No.: US 10,069,691 B2
(45) Date of Patent: Sep. 4, 2018

(54) METHOD AND APPARATUS FOR ANOMALY DETECTION IN A NETWORK

(71) Applicant: Telefonaktiebolaget LM Ericsson (publ), Stockholm (SE)

(72) Inventors: Tracy Hu, Beijing (CN); Qingyan Liu, Beijing (CN); Sky Zhao, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 100 days.

(21) Appl. No.: 15/039,064

(22) PCT Filed: Nov. 26, 2013

(86) PCT No.: PCT/CN2013/087844
§ 371 (c)(1),
(2) Date: May 25, 2016

(87) PCT Pub. No.: WO2015/077917
PCT Pub. Date: Jun. 4, 2015

(65) Prior Publication Data
US 2017/0026250 A1    Jan. 26, 2017

(51) Int. Cl.
G06F 15/16   (2006.01)
H04L 12/24   (2006.01)
G06F 12/00   (2006.01)

(52) U.S. Cl.
CPC .......... *H04L 41/142* (2013.01); *H04L 41/147* (2013.01); *H04L 41/5009* (2013.01)

(58) Field of Classification Search
CPC ........ G06N 99/005; G06N 7/005; G06N 3/08; G06N 5/04; G06N 3/04; G06N 3/0472; G06N 3/126; G06N 5/02; G06N 5/022; G06N 5/047; G06N 7/00; H04L 63/1425;
(Continued)

(56) References Cited

U.S. PATENT DOCUMENTS 8,254,391 B2 *   8/2012   Singh .................. G06F 11/1443
                                                             370/394
9,019,839 B2 *   4/2015   Ulybin ................ H04L 41/5067
                                                             358/400
(Continued)

FOREIGN PATENT DOCUMENTS

| CN | 101800674 A  | 8/2010 |
|----|--------------|--------|
| CN | 101854404 A  | 10/2010 |
| WO | 2009008783 A1| 1/2009 |

*Primary Examiner* — Zarni Maung
(74) *Attorney, Agent, or Firm* — Murphy, Bilak & Homiller, PLLC

(57) ABSTRACT

The disclosure provides a method (100) and apparatus for anomaly detection in a network. The method (100) comprises: obtaining (S110) a stream of time-series data related to the network; and dividing (S120) the stream into a number of sub-streams each corresponding to a category of data. The method further comprises, for each of the sub-streams: reconstructing (S130) a plurality of phase spaces; predicting (S140), in each of the plurality of phase spaces, whether a data item in the sub-stream is an anomaly candidate based on a prediction model associated with the phase space; and detecting (S150) the data item as an anomaly when it is predicted as an anomaly candidate in all of the plurality of phase spaces.

8 Claims, 4 Drawing Sheets

(58) Field of Classification Search
CPC ............. H04L 43/0876; H04L 63/1416; H04L 63/1483; H04L 12/40; H04L 2012/40228
See application file for complete search history.

(56) References Cited

U.S. PATENT DOCUMENTS

| | | | |
|---|---|---|---|
| 2004/0039968 A1* | 2/2004 | Hatonen | G06K 9/6284 714/39 |
| 2008/0310735 A1* | 12/2008 | Theiler | G06K 9/3241 382/209 |
| 2009/0044065 A1* | 2/2009 | She | H04L 1/06 714/748 |
| 2009/0112932 A1 | 4/2009 | Skierkowski et al. | |
| 2009/0238255 A1* | 9/2009 | Chau | H04B 7/0848 375/227 |
| 2010/0027432 A1 | 2/2010 | Gopalan et al. | |
| 2010/0299287 A1 | 11/2010 | Cao et al. | |
| 2011/0191076 A1* | 8/2011 | Maeda | G05B 23/0254 703/2 |
| 2013/0067106 A1 | 3/2013 | Lakshminarayan et al. | |
| 2014/0195184 A1* | 7/2014 | Maeda | G01D 18/006 702/85 |

* cited by examiner

METHOD AND APPARATUS FOR ANOMALY DETECTION IN A NETWORK

TECHNICAL FIELD

The disclosure generally relates to network performance monitoring, and more particularly, to a method and apparatus for anomaly detection in a network as well as associated computer program and computer program product.

BACKGROUND

With the rapid growth in network services, it becomes more and more important for network operators or service providers to monitor network performance or service quality, so as to detect any abnormal network behavior or service degradation and respond to it as quickly as possible.

As an example, Key Performance Indicator (KPI) data is used as a measure of network performance or service quality provided by a network. The KPI data is known as a category of time-series data. Conventionally, off-line statistical analysis methods are applied to time-series data, i.e., the time-series data needs to be stored first and then compared with one or more defined thresholds, so as to find an anomaly. However, there is typically a huge amount of KPI data that is generated at a very high speed. In this case, a large storage capacity is needed for storing the KPI data to be analyzed. Moreover, many manual operations are required to define and adjust the thresholds. However, for the KPI data, such manual operations become impractical as the number of network elements increases. It is thus a challenge to detect anomalies in the KPI data in a timely manner.

WO 2009/008783A1 discloses a method for measuring a performance indicator with reduced complexity. In the method, a performance filter is applied to a raw data and the performance indicator is calculated from the filtered data. In this way, it is possible to simultaneously measure a plurality of different performance indicators, by applying different performance filters and corresponding algorithms on the same raw data.

However, there is still a need for an improved solution for detecting abnormal network behavior or service degradation from the performance indicator data.

SUMMARY

It is an object of the disclosure to provide a method and apparatus for anomaly detection in a network as well as associated computer program and computer program product, capable of detecting anomalies from a large amount of network performance indicator data in a more timely manner.

According to a first aspect of the disclosure, a method for anomaly detection in a network in provided. The method comprises: obtaining a stream of time-series data related to the network; and dividing the stream into a number of sub-streams each corresponding to a category of data. The method further comprises, for each of the sub-streams: reconstructing a plurality of phase spaces; predicting, in each of the plurality of phase spaces, whether a data item in the sub-stream is an anomaly candidate based on a prediction model associated with the phase space; and detecting the data item as an anomaly when it is predicted as an anomaly candidate in all of the plurality of phase spaces.

The word "plurality" shall throughout the description and claims be interpreted as "more than one", i.e. the mathematical definition of the word.

In an embodiment, for each of the sub-streams, each of the plurality of phase spaces is represented by feature vectors each associated with a data item in the sub-stream. The above predicting step comprises: predicting, in each of the plurality of phase spaces, a data item in the sub-stream as an anomaly candidate when its associated feature vector is determined as abnormal based on the prediction model associated with the phase space.

In an embodiment, the prediction model represents a predetermined range in its associated phase space and any feature vector outside the predetermined range is determined as abnormal.

In an embodiment, the prediction model is initially constructed from a training data set and periodically updated based on data items that are not detected as anomalies.

In an embodiment, the prediction model is based on One Class Support Vector Machine (OCSVM).

In an embodiment, for each of the sub-streams, each of the plurality of phase spaces is reconstructed by applying an embedding function having a pair of dimension and lag as its arguments.

In an embodiment, the above steps of reconstructing, predicting and detecting are performed in a distributed manner over more than one computing node.

In an embodiment, the time-series data comprises Key Performance Indicator (KPI) data which is a measure of network performance or service quality provided by the network.

In an embodiment, the method further comprises a step of reporting the data item that is detected as an anomaly to a computer device for providing information about the anomaly.

According to a second aspect of the disclosure, an apparatus for anomaly detection in a network is provided. The apparatus comprises: a unit for obtaining a stream of time-series data related to the network; a unit for dividing the stream into a number of sub-streams each corresponding to a category of data; a unit for reconstructing, for each of the sub-streams, a plurality of phase spaces; a unit for predicting, in each of the plurality of phase spaces constructed for each of the sub-streams, whether a data item in the sub-stream is an anomaly candidate based on a prediction model associated with the phase space; and a unit for detecting, for each of the sub-streams, the data item as an anomaly when it is predicted as an anomaly candidate in all of the plurality of phase spaces.

In an embodiment, for each of the sub-streams, each of the plurality of phase spaces is represented by feature vectors each associated with a data item in the sub-stream. The unit for predicting is configured to predict, in each of the plurality of phase spaces, a data item in the sub-stream as an anomaly candidate when its associated feature vector is determined as abnormal based on the prediction model associated with the phase space.

In an embodiment, the prediction model represents a predetermined range in its associated phase space and any feature vector outside the predetermined range is determined as abnormal.

In an embodiment, the prediction model is initially constructed from a training data set and periodically updated based on data items that are not detected as anomalies.

In an embodiment, the prediction model is based on One Class Support Vector Machine (OCSVM).

In an embodiment, for each of the sub-streams, each of the plurality of phase spaces is reconstructed by applying an embedding function having a pair of dimension and lag as its arguments.

In an embodiment, the time-series data comprises Key Performance Indicator (KPI) data which is a measure of network performance or service quality.

In an embodiment, the apparatus further comprises: a unit for reporting the data item that is detected as an anomaly to a computer device for providing information about the anomaly.

According to a third aspect of the disclosure, an apparatus is provided. The apparatus comprises a processor and a memory. The memory comprises instructions executable by the processor whereby the apparatus is operative to obtain a stream of time-series data related to a network; and divide the stream into a number of sub-streams each corresponding to a category of data. The memory further contains instructions executable by the processor whereby the apparatus is operative to, for each of the sub-streams: reconstruct a plurality of phase spaces; predict, in each of the plurality of phase spaces, whether a data item in the sub-stream is an anomaly candidate based on a prediction model associated with the phase space; and detect the data item as an anomaly when it is predicted as an anomaly candidate in all of the plurality of phase spaces.

In an embodiment, for each of the sub-streams, each of the plurality of phase spaces is represented by feature vectors each associated with a data item in the sub-stream. Said predicting comprises predicting, in each of the plurality of phase spaces, a data item in the sub-stream as an anomaly candidate when its associated feature vector is determined as abnormal based on the prediction model associated with the phase space.

In an embodiment, the prediction model represents a predetermined range in its associated phase space and any feature vector outside the predetermined range is determined as abnormal.

In an embodiment, the prediction model is initially constructed from a training data set and periodically updated based on data items that are not detected as anomalies.

In an embodiment, the prediction model is based on One Class Support Vector Machine (OCSVM).

In an embodiment, for each of the sub-streams, each of the plurality of phase spaces is reconstructed by applying an embedding function having a pair of dimension and lag as its arguments.

In an embodiment, the time-series data comprises Key Performance Indicator (KPI) data which is a measure of network performance or service quality.

In an embodiment, said memory further contains instructions executable by said processor whereby said apparatus is operative to report the data item that is detected as an anomaly to a computer device for providing information about the anomaly.

According to a fourth aspect of the disclosure, a computer program is provided. The computer program comprises computer readable instructions which, when run on an apparatus, cause the apparatus to: obtain a stream of time-series data related to a network; divide the stream into a number of sub-streams each corresponding to a category of data. The computer program further comprises computer readable instructions which, when run on the apparatus, cause the apparatus to, for each of the sub-streams: reconstruct a plurality of phase spaces; predict, in each of the plurality of phase spaces, whether a data item in the sub-stream is an anomaly candidate based on a prediction model associated with the phase space; and detect the data item as an anomaly when it is predicted as an anomaly candidate in all of the plurality of phase spaces.

According to a fifth aspect of the disclosure, a computer program storage product is provided. The computer program product comprises computer readable storage means storing the computer program of the above fourth aspect.

According to a sixth aspect of the disclosure, a distributed computing system for anomaly detection in a network is provided. The distributed computing system comprises a plurality of computing nodes, at least one of which is configured to: obtain a stream of time-series data related to the network; divide the stream into a number of sub-streams each corresponding to a category of data; and distribute each of the sub-streams to a first computing node. Each first computing node is configured to: reconstruct, for the sub-stream distributed to the first computing node, a plurality of phase spaces and distribute each of the plurality of phase spaces to a second computing node for predicting whether a data item in the sub-stream is an anomaly candidate based on a prediction model associated with the phase space; and detect the data item as an anomaly when it is predicted as an anomaly candidate in all of the plurality of phase spaces.

With the embodiments of the disclosure, the time-series data related to the network is processed as a data stream. The stream is divided into sub-streams each corresponding to a category of data. Then, for each of the sub-streams, more than one phase space is reconstructed. In each of the phase spaces, it is detected whether a data item in the sub-stream is an anomaly candidate based on a prediction model associated with the phase space. Finally, a data item is detected as an anomaly when it is predicted as an anomaly candidate in all of the phase spaces. Thus, there is no need for storing all of the data since it is processed in a streaming manner. The division of the stream into sub-streams provides potential for distributed processing. The use of prediction model eliminates the need for manual operations which would be necessary in threshold-based solutions. In this way, it is possible to detect anomalies from a large amount of network data in a more timely manner. Furthermore, for each category of data, a number of phase spaces are reconstructed and a data item is determined as an anomaly only when it is predicted as an anomaly candidate in all of the phase spaces, which allows a comprehensive analysis of the data item.

BRIEF DESCRIPTION OF THE DRAWINGS

The above and other objects, features and advantages will be more apparent from the following description of embodiments with reference to the figures, in which.

DETAILED DESCRIPTION

The embodiments of the present disclosure will be detailed below with reference to the drawings. It should be noted that the following embodiments are illustrative only, rather than limiting the scope of the present disclosure.

Figure 1:
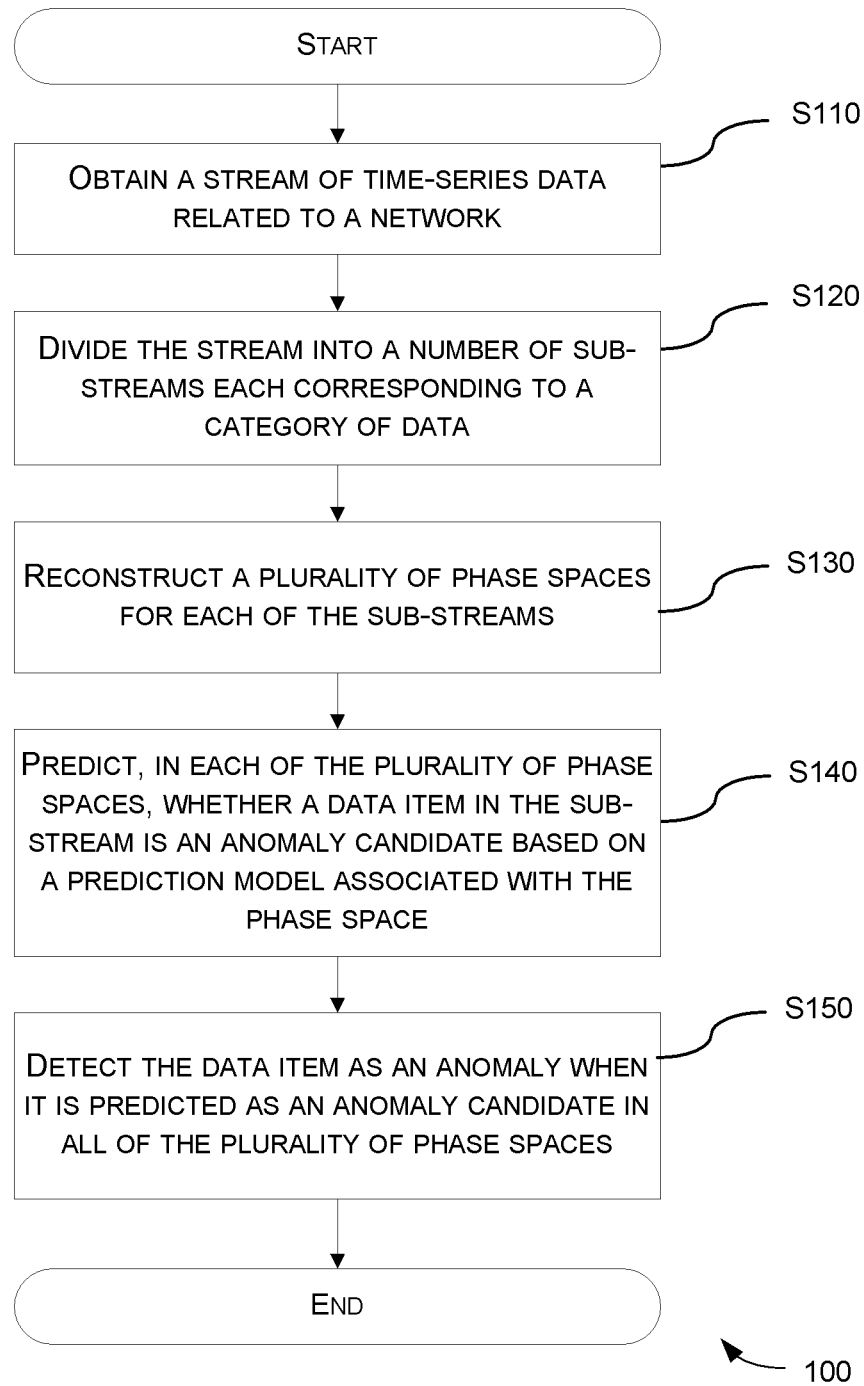
FIG. 1 is a flowchart illustrating a method for anomaly detection in a network according to an embodiment of the disclosure.

FIG. 1 is a flowchart illustrating a method 100 for anomaly detection in a network according to an embodiment of the disclosure. The method includes the steps as described below.

At step S110, a stream of time-series data related to the network is obtained, e.g., by receiving the stream from a base station via a socket connection. In an example, the time-series data can be the Key Performance Indicator (KPI) data as mentioned above. It is to be noted here that the disclosure is not limited to the KPI data, but is applicable to other time-series data representing network performance or service quality provided by the network.

At step S120, the stream is divided into a number of sub-streams each corresponding to a category of data. For example, there are several categories of KPI data, including Base Station Controller Answer Input/Output, Base Station Controller Answer Rate Input/Output, Base Station Controller Location Update Success Rate and Base Station Controller Paging Success Rate. Each KPI data item in the stream may have a KPI category identifier identifying the category to which it belongs. Thus, a KPI data stream can be divided into several sub-streams based on the KPI category identifiers of each KPI data item in the stream. Each sub-stream may contain KPI data items having the same KPI category identifier.

Then, for each of the sub-streams, the subsequent steps S130-S150 are carried out. Thus, while the following description of the steps S130-150 will be given with respect to only one of the sub-streams, denoted as SS, it also applies to any other sub-stream resulted from the step S120.

At step S130, a plurality of phase spaces are reconstructed for the sub-stream SS. Here, each of the phase spaces can be reconstructed by applying an embedding function having a pair of dimension and lag as its arguments.

Mathematically, the embedding function, F, can be represented as:

$$F(x(t)) = [\Phi(x(t)), \Phi(f^1(x(t))), \ldots, \Phi(f^{M-1}(x(t)))]^T$$
$$= [y(t), y(t-\tau), \ldots, y(t-(M-1)\tau)]^T$$

where x(t) denotes the data items in the sub-stream SS with a time index t, M denotes the dimension, $\tau$ denotes the lag ($\tau \geq 0$), $f^i(\bullet)$, i=1, 2, ..., M-1 are linear decision functions, $\Phi(\bullet)$ denotes a map function that transforms its input from an original space to a feature space, $[\bullet]^T$ denotes transposition and y(t) denotes a feature vector in the resulted phase space.

For example, when the sub-stream SS contains data items Xt1, Xt2, Xt3, ..., with an embedding function having a dimension M=3 and a lag $\tau$=1, the reconstructed phase space can be represented as:

[Yt1=(Xt1,Xt2,Xt3),Yt2=(Xt2,Xt3,Xt4),Yt3=(Xt3,Xt4, Xt5), ... ]

where Yt1, Yt2, Yt3, ... are feature vectors associated with the data items Xt1, Xt2, Xt3, ..., respectively.

That is, each of the phase spaces reconstructed in the step S130 can be represented by feature vectors each associated with a data item in the sub-stream SS. In other words, each phase space is composed of feature vectors representing the data items in the sub-stream SS with a particular pair of dimension and lag.

At step S140, in each of the plurality of phase spaces reconstructed for the sub-stream SS, it is predicted whether a data item in the sub-stream SS is an anomaly candidate based on a prediction model associated with the phase space. For the purpose of illustration, the following description of the step S140 will be given with respect to only one of the phase spaces, denoted as PS. However, as can be appreciated by those skilled in the art, it also applies to any other phase spaces resulted from the step S130.

More specifically, in the phase space PS, a data item in the sub-stream SS is predicted as an anomaly candidate when its associated feature vector is determined as abnormal based on the prediction model associated with the phase space PS.

Figure 2:
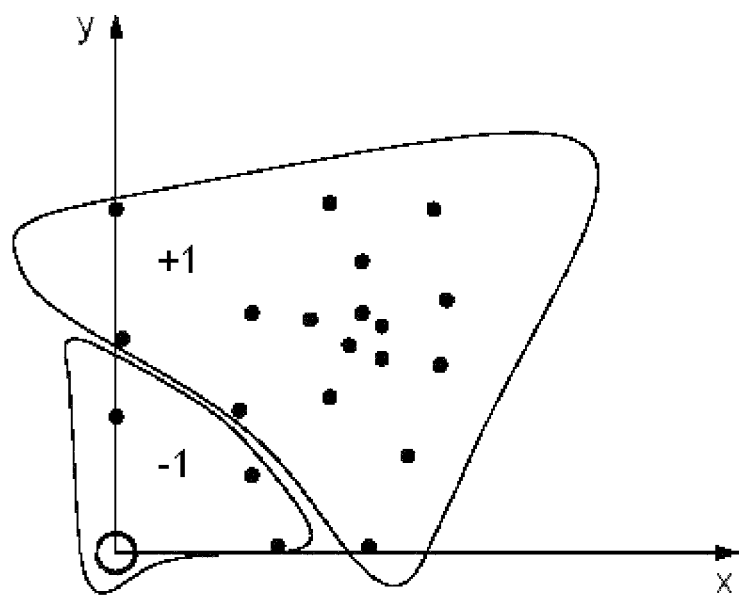
FIG. 2 is a schematic diagram of a prediction model according to an embodiment of the disclosure.

FIG. 2 is a schematic diagram of an exemplary prediction model in the phase space PS. The prediction model shown in FIG. 2 is based on One Class Support Vector Machine (OCSVM). It can be appreciated by those skilled in the art that the disclosure is not limited to OCSVM and other model-based prediction techniques, such as Autoregressive Integrated Moving Average Model (ARIMA), can also be used.

As shown in FIG. 2, each feature vector in the phase space PS is mapped onto a dot in the two-dimensional x-y plane. It is to be noted here that the prediction model can also be represented in a three or even higher dimensional space, depending on the dimension M of the embedding function used for reconstructing the phase space PS. The prediction model represents a predetermined range in its associated phase space PS (also referred to as "normal range" hereafter) and any feature vector outside the predetermined range is determined as abnormal. The region labeled "+1" in FIG. 2 denotes the normal range. The feature vectors represented by the dots within the "+1" region are considered to be "normal"; whereas the other vectors represented by the dots outside the "+1" region (i.e., within the region labeled "−1" in FIG. 2) are determined as abnormal.

Here, the prediction model is initially constructed from a training data set containing data samples that are determined to be normal by e.g., a network operator or a service provider (for example, by means of threshold-based comparison). Then, it can be periodically updated based on data items that are not detected as anomalies. More specifically, the feature vectors associated with the data items that are not detected as anomalies can be used as the basis for updating the prediction model. In this way, the prediction model has a self-learning capability and can be automatically updated without any human intervention.

At step S150, a data item in the sub-stream SS is detected as an anomaly when it is predicted as an anomaly candidate in all of the plurality of phase spaces reconstructed for the sub-stream SS.

Then, the data item detected as an anomaly can be reported to a computer device for providing information about the anomaly. For example, the computer device can store and provide this information to a network administrator such that the administrator can take appropriate measures to solve problems associated with the anomaly. For example, when an anomaly associated with base station controller answer rate is detected and reported to the computer device, the computer device can provide a warning message about the anomaly to the network administrator and then the network administrator may confirm and fix the associated problem by e.g., adjusting an antenna in the base station controller.

It can be seen that there is no need for storing all of the time-series data to be processed since it is processed in a streaming manner. The use of prediction model eliminates the need for manual operations which would be necessary in threshold-based solutions. In this way, it is possible to detect anomalies from a large amount of network data in a more timely manner. Furthermore, for each category of data, a number of phase spaces are reconstructed and a data item is determined as an anomaly only when it is predicted as an anomaly candidate in all of the phase spaces, which allows a comprehensive analysis of the data item.

Also, the number of phase spaces reconstructed for one category of data can be independent from the number of phase spaces reconstructed for any other category of data, which provides an improved flexibility in detecting anomalies from different categories of data.

Further, the division of the stream into sub-streams provides potential for distributed processing. In particular, the above steps S130-S150 can be performed in a distributed manner over more than one computing node.

Figure 3:
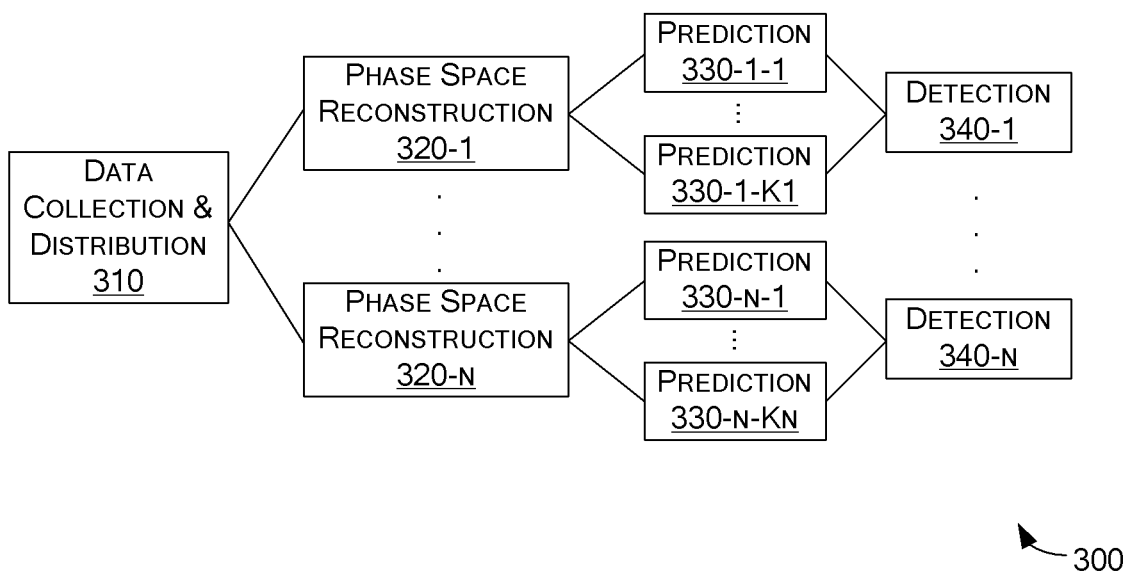
FIG. 3 is a schematic diagram showing a distributed computing scenario according to an embodiment of the disclosure.

Reference is now made to FIG. 3, which shows a distributed computing system 300. The distributed computing system 300 includes a plurality of computing nodes. At least one of these computing nodes, e.g., a data collection and distribution node 310, obtains a stream of time-series data related to the network, divides the stream into a number of sub-streams each corresponding to a category of data, and distributes each of the sub-streams to a phase space reconstruction node 320-1, . . . , 320-n. For the purpose of illustration, the following description will be given with respect to the phase space reconstruction node 320-1. However, as can be appreciated by those skilled in the art, it also applies to any other phase space reconstruction nodes 320-2, . . . , 320-n.

The phase space reconstruction node 320-1 reconstructs, for the sub-stream distributed to that phase space reconstruction node, a number, K1, of phase spaces and distributes each of the K1 phase spaces to a prediction node 330-1-K1, . . . , 330-1-Kn for predicting whether a data item in the sub-stream is an anomaly candidate based on a prediction model associated with the phase space.

Then, the prediction results from the prediction nodes 330-1-K1, . . . , 330-1-Kn are output to the detection node 340-1, which detects the data item as an anomaly when it is predicted as an anomaly candidate in all of the plurality of phase spaces. In an embodiment, the phase space reconstruction node 320-1 can also serve as the detection node 340-1. In this case, the prediction results from the prediction nodes 330-1-K1, . . . , 330-1-Kn can be fed back to the phase space reconstruction node 320-1 for anomaly detection.

Here, each of the computing nodes shown in FIG. 3 can be implemented as a Processing Element (PE) in a stream processing framework such as S4, Storm, etc. Alternatively, the distributed computing system 300 can be implemented based on real-time Hadoop frameworks such as Impala and Spark.

Figure 4:
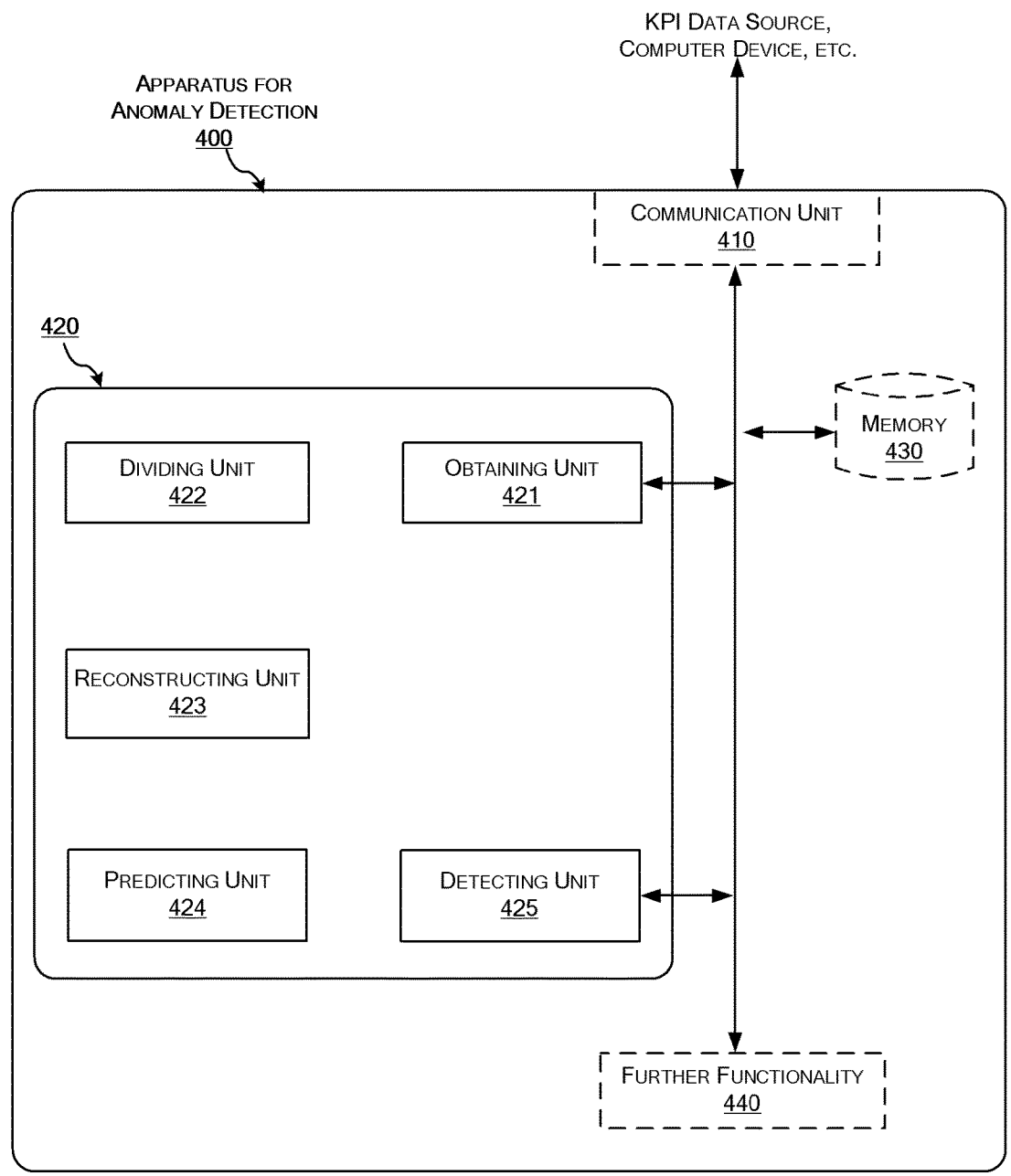
FIG. 4 is a schematic diagram of an apparatus for anomaly detection according to an embodiment of the disclosure.

FIG. 4 is a schematic diagram of an apparatus 400 for anomaly detection in a network according to an embodiment of the disclosure.

As shown in FIG. 4, the apparatus 400 includes a communication unit 410 for communicating with other entities such as a data source and a computer device for providing information about any detected anomaly. The apparatus 400 further includes an arrangement 420 for implementing the method described above with reference to FIG. 1. The apparatus 400 may further comprise one or more memories 330 and one or more further functional units 340, such as a functional unit for generating an anomaly detection report.

The arrangement 420 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3. The arrangement 420 may be implemented and/or described as follows Referring to FIG. 4, the apparatus 400 includes an obtaining unit 421 that obtains a stream of time-series data related to the network.

The apparatus 400 further includes a dividing unit 422 that divides the stream into a number of sub-streams each corresponding to a category of data.

The apparatus 400 further includes a reconstructing unit 423 that reconstructs, for each of the sub-streams, a plurality of phase spaces.

The apparatus 400 further includes a predicting unit 424 that predicts, in each of the plurality of phase spaces constructed for each of the sub-streams, whether a data item in the sub-stream is an anomaly candidate based on a prediction model associated with the phase space.

The apparatus 400 further includes a detecting unit 425 that detects, for each of the sub-streams, the data item as an anomaly when it is predicted as an anomaly candidate in all of the plurality of phase spaces.

It is to be noted here that the respective units 421-425 can be implemented as software components or hardware circuits.

In an embodiment, for each of the sub-streams: each of the plurality of phase spaces is represented by feature vectors each associated with a data item in the sub-stream and the predicting unit 424 is configured to predict, in each of the plurality of phase spaces, a data item in the sub-stream as an anomaly candidate when its associated feature vector is determined as abnormal based on the prediction model associated with the phase space.

In an embodiment, the prediction model represents a predetermined range in its associated phase space and any feature vector outside the predetermined range is determined as abnormal.

In an embodiment, the prediction model is initially constructed from a training data set and periodically updated based on data items that are not detected as anomalies.

In an embodiment, the prediction model is based on One Class Support Vector Machine (OCSVM).

In an embodiment, for each of the sub-streams: each of the plurality of phase spaces is reconstructed by applying an embedding function having a pair of dimension and lag as its arguments.

In an embodiment, the time-series data comprises Key Performance Indicator (KPI) data which is a measure of network performance or service quality.

Figure 5:
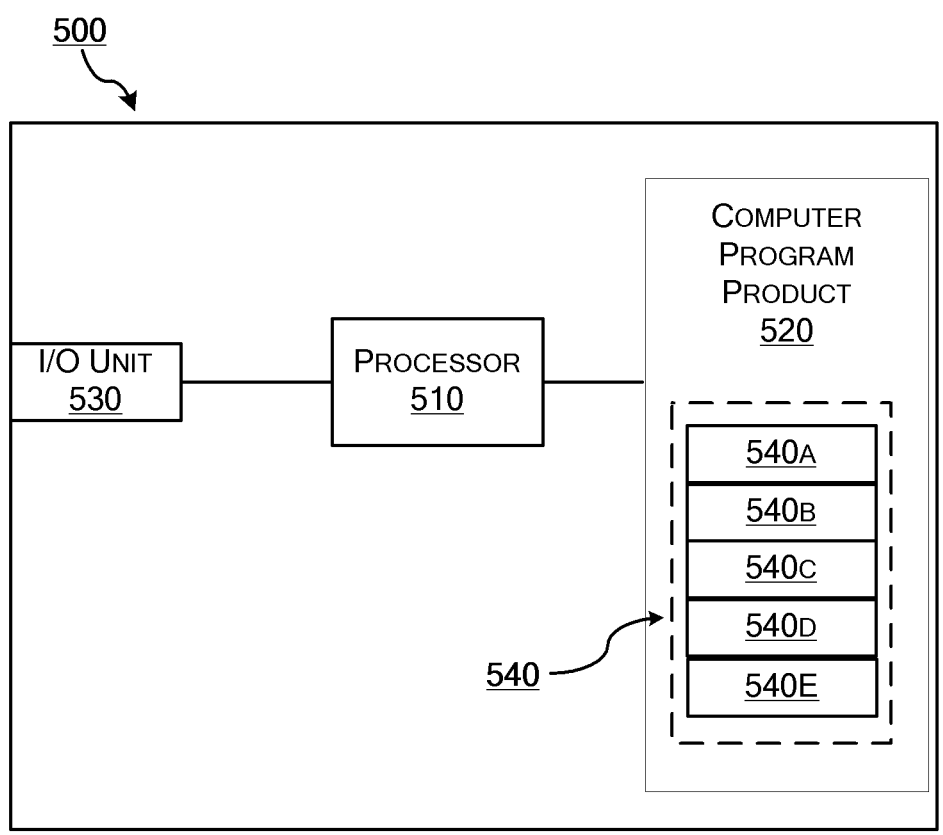
FIG. 5 is a schematic diagram of an arrangement that can be used in an apparatus for anomaly detection according to an embodiment of the disclosure.

In an embodiment, the apparatus 400 further includes a reporting unit (not shown) that reports the data item that is detected as an anomaly to a computer device for providing information about the anomaly FIG. 5 shows an embodiment of an arrangement 500 which may be used in the apparatus 400. The arrangement 500 includes a processor 510, e.g., a Digital Signal Processor (DSP). The processor 510 may be a single unit or a plurality of units to perform different actions of procedures described herein. The arrangement 500 may also comprise an input/output unit 530 for receiving/sending signal from/to other entities.

Furthermore, the arrangement 500 includes at least one computer program storage product 520 in the form of a non-volatile or volatile memory, e.g., an Electrically Erasable Programmable Read-Only Memory (EEPROM), a flash memory and a hard drive. In other words the computer program storage product 520 comprises or is, irrespective of embodiment, a non-transitory computer readable medium. The computer program storage product 520 includes a computer program 540, which includes code/computer readable instructions, which when executed by the processor 510 in the arrangement 500 causes the arrangement 500 and/or the apparatus 400 in which it is included to perform the actions, e.g., of the procedure described earlier in conjunction with FIG. 1.

The computer program 540 may be configured as a computer program code comprising computer program parts 540A-540D.

Hence, in an exemplifying embodiment, the code in the computer program of the arrangement 500 includes an obtaining part 540A for obtaining a stream of time-series data related to a network. The code in the computer program of the arrangement 500 further includes a dividing part 540B for dividing the stream into a number of sub-streams each corresponding to a category of data. The code in the computer program of the arrangement 500 further comprises a reconstructing part 540C for reconstructing, for each of the sub-streams, a plurality of phase spaces. The code in the computer program of the arrangement 500 further includes a predicting part 540D for predicting, in each of the plurality of phase spaces constructed for each of the sub-streams, whether a data item in the sub-stream is an anomaly candidate based on a prediction model associated with the phase space. The code in the computer program of the arrangement 500 further comprises a detecting part 540E for detecting, for each of the sub-streams, the data item as an anomaly when it is predicted as an anomaly candidate in all of the plurality of phase spaces.

The computer program parts could essentially perform the actions of the flow illustrated in FIG. 1, to emulate the arrangement 420 in the apparatus 400. In other words, when the different computer program parts are executed in the processor 510, they may correspond, e.g., to the units 421-424 of FIG. 4.

Although the code means in the embodiments disclosed above in conjunction with FIG. 5 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for anomaly detection in a network, the method performed by an apparatus configured for monitoring performance of the network and comprising:
    receiving a stream of time-series data from one or more nodes in the network, the time-series data comprising data items comprising or derived from performance or service-quality measurements for one or more categories of network performance;
    dividing the stream into sub-streams, each sub-stream corresponding to one of the one or more categories of network performance; and
    for each of the sub-streams:
        reconstructing a plurality of phase spaces, each phase space having two or more dimensions corresponding to respective system variables of the network represented by the sub-stream and reconstructed by applying a corresponding embedding function to the sub-stream, to obtain feature vectors corresponding to respective ones of the data items comprising the sub-stream, each corresponding embedding function having a unique pairing of embedding dimension and lag for the sub-stream;
        for each phase space, identifying feature vectors that lie outside of a normal range learned for the phase space;
        detecting anomalous data items in the sub-stream by detecting data items for which the corresponding feature vectors all lie outside normal ranges learned for the respective phase spaces; and
    storing or reporting indications of the anomalous data items.

2. The method of claim 1, wherein the normal range for each phase space is initially learned from a training data set and is periodically updated based on data items subsequently received for the corresponding sub-stream that are not detected as anomalous.

3. The method of claim 1, wherein the normal range for each phase space is based on One Class Support Vector Machine (OCSVM).

4. The method of claim 1, wherein the time-series data comprises Key Performance Indicator (KPI) data which is a measure of network performance or service quality provided by the network.

5. An apparatus comprising a processor and a memory, said memory comprising instructions executable by said processor whereby said apparatus is operative to:
    receive a stream of time-series data from one or more nodes in the network, the time-series data comprising data items comprising or derived from performance or service-quality measurements for one or more categories of network performance;
    divide the stream into sub-streams, each sub-stream corresponding to one of the one or more performance categories; and
    for each of the sub-streams:
        reconstruct a plurality of phase spaces, each phase space having two or more dimensions corresponding to respective system variables of the network represented by the sub-stream and reconstructed by applying a corresponding embedding function to the sub-stream, to obtain feature vectors corresponding to respective ones of the data items comprising the sub-stream, each corresponding embedding function having a unique pairing of embedding dimension and lag for the sub-stream;

for each phase space, identify feature vectors that lie outside of a normal range learned for the phase space;

detect anomalous data items in the sub-stream by detecting data items for which the corresponding feature vectors all lie outside normal ranges learned for the respective phase spaces; and store or report indications of the anomalous data items.

6. The apparatus of claim 5, wherein the normal range for each phase space is initially learned from a training data set and is periodically updated based on data items subsequently received for the corresponding sub-stream that are not detected as anomalous.

7. The apparatus of claim 5, wherein the normal range for each phase space is based on One Class Support Vector Machine (OCSVM).

8. The apparatus of claim 5, wherein the time-series data comprises Key Performance Indicator (KPI) data which is a measure of network performance or service quality.

\* \* \* \* \*